(12) United States Patent
Brundridge et al.

(10) Patent No.: US 7,131,031 B2
(45) Date of Patent: Oct. 31, 2006

(54) SYSTEM AND METHOD FOR ON-LINE DIAGNOSING OF NETWORK INTERFACE CARDS

(75) Inventors: Michael A. Brundridge, Georgetown, TX (US); Radhakrishna R. Dasari, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 573 days.

(21) Appl. No.: 10/443,607

(22) Filed: May 22, 2003

(65) Prior Publication Data

US 2004/0236991 A1    Nov. 25, 2004

(51) Int. Cl.
*G06F 11/00* (2006.01)

(52) U.S. Cl. ............... 714/25; 714/30; 709/224
(58) Field of Classification Search .......... 714/25, 714/30, 33, 43; 709/231, 234
See application file for complete search history.

(56) References Cited

U.S. PATENT DOCUMENTS

| | | | |
|---|---|---|---|
| 5,107,500 A | 4/1992 | Wakamoto et al. ........ 371/15.1 |
| 5,377,196 A | 12/1994 | Godlew et al. ........... 371/20.1 |
| 5,446,680 A | 8/1995 | Sekiya et al. .............. 364/550 |
| 5,559,955 A | 9/1996 | Dev et al. ............... 395/182.02 |
| 5,561,769 A | 10/1996 | Kumar et al. .......... 395/200.05 |
| 5,627,766 A | 5/1997 | Beaven ................... 364/551.01 |
| 5,699,350 A * | 12/1997 | Kraslavsky ................. 370/254 |
| 5,710,885 A | 1/1998 | Bondi ................... 395/200.54 |
| 6,539,427 B1 * | 3/2003 | Natarajan et al. ........... 709/224 |
| 6,654,914 B1 * | 11/2003 | Kaffine et al. ................ 714/43 |
| 6,718,384 B1 * | 4/2004 | Linzy .......................... 709/224 |
| 6,745,333 B1 * | 6/2004 | Thomsen ...................... 726/23 |
| 6,754,844 B1 * | 6/2004 | Mitchell ........................ 714/4 |
| 6,789,114 B1 * | 9/2004 | Garg et al. ................. 709/224 |
| 6,801,948 B1 * | 10/2004 | Clark et al. ................ 709/231 |
| 6,978,465 B1 * | 12/2005 | Williams .................... 719/321 |
| 2002/0019870 A1 | 2/2002 | Chirashnya et al. | |

\* cited by examiner

*Primary Examiner*—Robert Beausoliel
*Assistant Examiner*—Amine Riad
(74) *Attorney, Agent, or Firm*—Baker Botts L.L.P.

(57) ABSTRACT

A system and method for on-line diagnosing a network interface card (NIC) includes a NIC configuration test module, a NIC communication test module and a test response generator. An information handling system includes a server having a NIC that is able to communicate with a network. The NIC configuration test module detects configuration errors associated with the NIC. The NIC communication test module determines if the NIC can communicate with another server by identifying at least one associated address, sending at least one packet to the associated address and receiving at least one packet from the associated address.

20 Claims, 3 Drawing Sheets

SYSTEM AND METHOD FOR ON-LINE DIAGNOSING OF NETWORK INTERFACE CARDS

TECHNICAL FIELD

The present disclosure relates in general to information handling systems, and more particularly to a system and method for on-line diagnosing of network interface cards in data communication networks.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems connected to a network provide greater access to data and processing resources and facilitate the exchange of information. In order to connect to a network, an information handling system typically needs a network interface card (NIC). A NIC allows an information handling system to communicate with other information handling systems in a network environment.

If a NIC does not function properly, the information handling system typically lacks networking capabilities. A NIC may fail to operate in a variety of ways. The failure may originate from either a hardware or software problem and may not be readily apparent to the user.

Solutions to networking problems have typically focused on detecting problems communicating with other information handling systems. For example, one solution tests whether nodes of external information handling systems are able to respond to a communication from a NIC. However, this solution does not diagnose whether the NIC is properly sending a signal to the external node.

Other solutions for diagnosing problems related to the operation of a NIC focus on testing specific types or models of NIC produced by a specific manufacturer. However, such manufacturer-specific testing software creates an administrative burden on system administrators and other users. Additionally, current systems often do not detect or identify problems relating to the interaction of hardware and software associated with the NIC.

SUMMARY

Therefore, a need has arisen for a system and method for comprehensively diagnosing problems associated with network interface cards (NICs).

A further need exists for a system and method to diagnose problems with a NIC that can alert a user of specific problem encountered with the NIC.

A further need exists for a system and method to diagnose a NIC while both the information handling system and NIC are operating in a network.

A further need exists for a system and method for diagnosing NIC problems that may test NICs from multiple manufacturers operating in multiple operating system environments.

In accordance with the teachings of the present disclosure, a system and method for on-line diagnosing of network interface cards is provided that substantially reduces disadvantages and problems associated with previously developed systems and methods to diagnose network interface cards. An information handling system includes a NIC configuration test module, a NIC communication test module and a test response generator. In operation, the NIC configuration test module detects configuration problems with the NIC, the NIC communication test module detects communication problems with the NIC, and the test response generator creates an appropriate test results message to inform the user of the test results.

In one aspect, an information handling system is disclosed that includes a server having a NIC that can communicate with a network, a NIC configuration test module, a NIC communication test module and a test response generator. The NIC configuration test module detects NIC configuration errors. The NIC communication test module is able to identify a local network address, send a packet to the local address, and receive a response from the local address. More specifically, the NIC configuration module includes a driver discovery module, a TCP/IP stack test module, and a connector test module. The driver discovery module is able to test whether a driver is properly associated with the NIC. The TCP/IP stack test module tests whether the TCP/IP stack is properly loaded. The connector test module tests whether the cables that connect the NIC to the network are connected and functioning properly.

In another aspect of the present disclosure, a method to test a NIC within a server includes testing the NIC to detect configuration errors associated with the NIC, identifying an associated server with a valid address, testing the NIC to determine whether the NIC communicates with the associated server and generating a test result response describing a detected error. In one embodiment, the associated server address may be identified by a dynamic host configuration protocol (DHCP) module, a gateway discovery module, an address resolution protocol (ARP) module, a broadcast discovery module, or an address iteration module.

More specifically, the NIC configuration module and the NIC communication module are able to test the NIC while the NIC is operating. In another embodiment, the NIC configuration module and the NIC communication module functions in two or more operating system environments.

Important technical advantages of certain embodiments of the present disclosure include providing a NIC configuration module and a NIC communication module that comprehensively test the hardware and software features of a NIC. These modules test both the hardware connections for integrity and the operation of the software in conjunction with the hardware.

Another important technical advantage of the present disclosure is the inclusion of the test response generator that advantageously notifies a user of problems encountered by the NIC configuration module and the NIC communication module.

Another important technical advantage of certain embodiments of the present disclosure is that the NIC configuration module and the NIC communication module are able to test a NIC while the NIC is operating. This allows testing of the NIC without having to interrupt the use of the network resources.

Additional technical advantages of certain embodiments of the present disclosure include a NIC configuration module and a NIC communication module that can test multiple types of NICs made by multiple different manufacturers and may perform testing in multiple operating system environments.

All, some, or none of these technical advantages may be present in various embodiments of the present disclosure and other technical advantages will be readily apparent to those skilled in the art from the following FIGURES, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to the figures, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
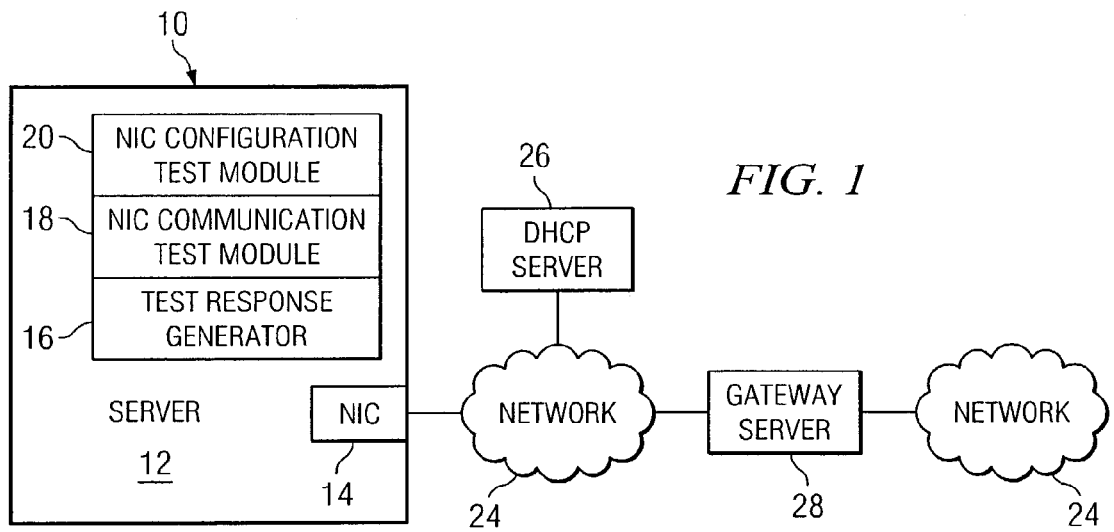
FIG. 1 illustrates a block diagram of an information handling system associated with a network according to teachings of the present disclosure.

FIG. 1 illustrates a block diagram of an information handling system, depicted generally at 10, associated with network 24. In the present embodiment, information handling system 10 includes server 12. Server 12 is preferably in communication with network 24 and manages network resources and network traffic. Server 12 may operate on a peer-to-peer network, a local area network (LAN) or a wide area network (WAN). On a LAN or WAN server 12 preferably includes administrative software necessary to control and access the resources of the network. Server 12 may also run on the internet. On the internet server 12 preferably includes network operating software necessary to interact with other servers. This software may include various applications such as Windows or Linux based operating software. These applications preferably allow a server to manage the transfer of data and maintain the security of the network.

Server 12 includes network interface card (NIC) 14, NIC configuration test module 20, NIC communication test module 18 and test response generator 16. NIC 14 is preferably in operative communication with network 24. NIC 14 connects information handling system 10 to network 24 including DHCP server 26 and gateway server 28. NIC 14 may be an expansion board, an ethernet card or a PC card. NIC 14 preferably employs Transmission Control Protocol/Internet Protocol (TCP/IP) in communicating with network 24.

NIC configuration test module 20 detects configuration errors associated with NIC 14. NIC configuration test module 20 generally tests hardware connections and checks hardware/software interactions to determine whether NIC 14 has any configuration error conditions. NIC configuration test module 20 may test NIC 14 while NIC 14 is communicating with network 24 or while NIC 14 is not in active communication with network 24. NIC configuration test module 20 then reports any configuration error conditions detected in NIC 14 to test response generator 16. If no configuration error conditions have been detected, then test response generator 16 indicates that the configuration that has been completed and no configuration error conditions have been detected.

NIC communication test module 18 generally tests if NIC 14 effectively communicates with associated network 24. FIG. 1 also illustrates two servers further associated with network 24: DHCP server 26 and gateway server 28. NIC communication test module 18 preferably identifies at least one address of an associated server which may also be referred to as a local server. As described below, NIC communication test module 18 may identify the address of DHCP server 26 or gateway server 28 by communicating with instrumentation service 23 associated with server 12. Additionally, NIC communication test module 18 also preferably determines whether the identified address (or addresses) is valid.

NIC test communication test module 18 further sends one or more packets to the identified address and is further operable to receive responses therefrom. For example, NIC communication test module 18 may send packets such as ping packets to servers such as DHCP server 26 and gateway server 28. Packets sent by NIC communication test module 18 may be any network communication sent by server 12 to another server requesting a response or acknowledgement. A packet may include a message containing the destination address in addition to other data. In the present embodiment, packets sent by NIC communication test module 18 include datagrams and Internet Control Message Protocol(ICMP) ping packets.

Like NIC configuration test module 20, NIC communication test module 18 may test NIC 14 while NIC 14 is in operation or while NIC 14 is idle and not otherwise in operation.

In operation, NIC configuration test module 20 and NIC communication test module 18 preferably diagnose problems, errors, or malfunctions in NICs from multiple manufactures. Further, NIC test modules 18 and 20 may test NIC 14 in various different operating system environments. In one particular embodiment, NIC configuration module 20 and NIC communication module function in at least two operating system environments, such as Windows 2000 and Linux 7.1.

Test response generator 16 generates user responses based on the test results of NIC configuration test module 20 and NIC communication test module 18. If either modules 18 or 20 detect an error condition, test response generator 16 sends an error message indicating the identified error condition. For example, if NIC configuration module test module detects a cable disconnection, test response generator 18 sends a CABLE_DISCONNECTED message to the user. If the NIC communication test module 18 determines that the packet send operation failed, test response generator 18 sends a DATA_SEND_ERROR message to the user. In one embodiment, if no error conditions are detected, test response generator 16 generates and sends a passing message, such as PASSED.

In the present embodiment network 24 connects information handling system 10 with DHCP server 26 and gateway server 28. Dynamic Host Configuration Protocol (DHCP) server 26 includes a network address and is further operable to assign IP addresses to other servers in network 24 in accordance with DHCP. Gateway server 28 is a server on network 24 with a network address and is also operable to act as an entrance to another network such as network 24. Network 24 may further incorporate additional nodes.

Figure 2:
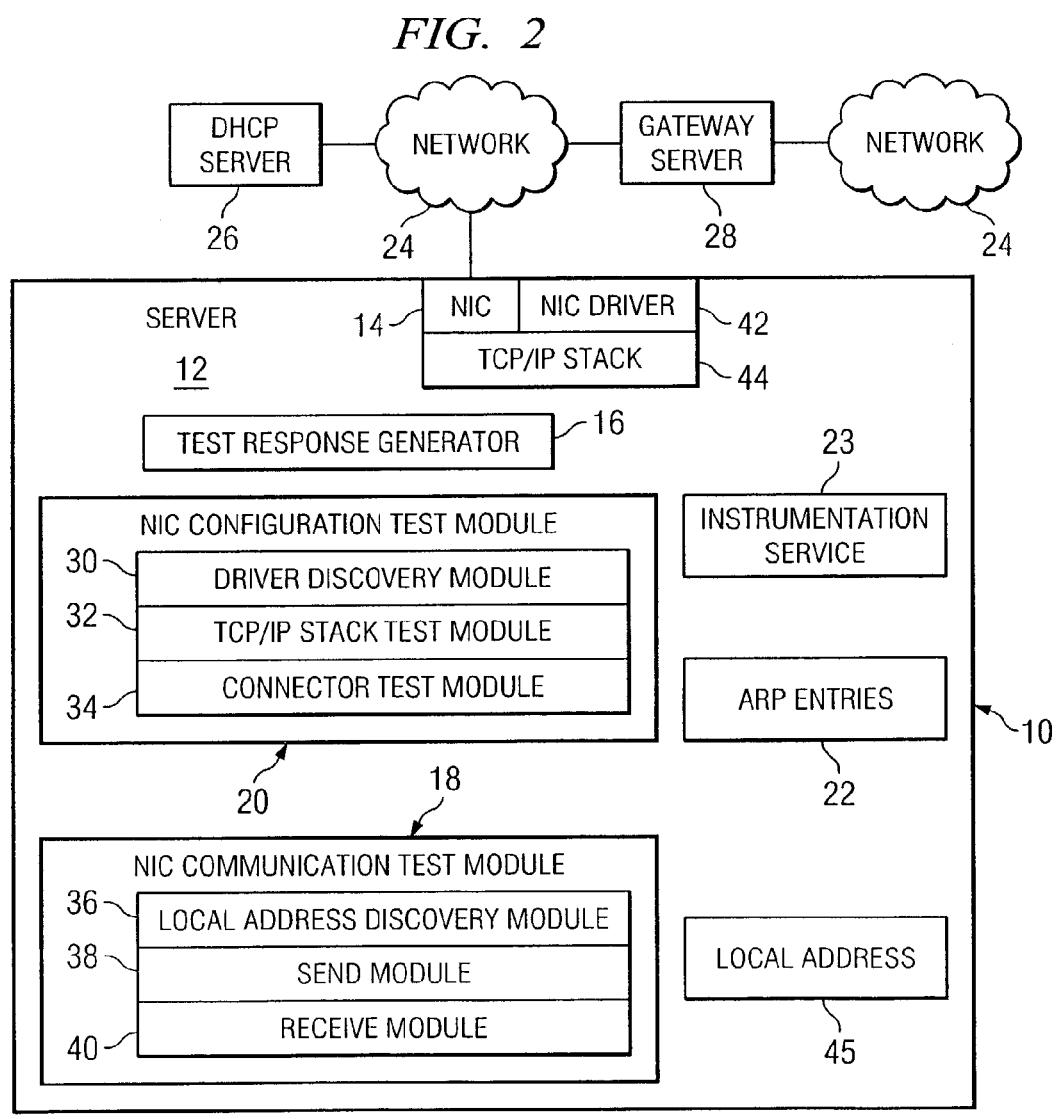
FIG. 2 illustrates a block diagram of a particular embodiment of an information handling system associated with a network.

FIG. 2 illustrates a particular embodiment of information handling system 10 associated with network 24. In the present embodiment, NIC 14 includes NIC driver 42 and TCP/IP stack 44. NIC driver 42 preferably includes software operable to allow server 12 to interface with NIC 14. Transmission control protocol/internet protocol (TCP/IP) stack 44 preferably includes utilities for allowing information handling system 10 to communicate over TCP/IP networks and is generally associated with NIC 14.

Server 12 also includes instrumentation service 23. Instrumentation service 23 provides enumeration and configuration information for hardware devices, such as NIC 14, in information handling system 10. Instrumentation service 23 may gather enumeration and configuration information by a combination of methods including, issuing IOCTL calls to the devices, using Windows registry keys and using Windows management instrumentation application program interface (WMI API). In Linux systems, instrumentation service 23 may gather enumeration and configuration information by reading the /proc/pci file system. Generic information gathered by instrumentation service 23 may include the interrupt request line (IRQ), bus number, device number, function number, and base address for NIC 14. Configuration related information obtained by instrumentation service 23 may include bus numbers, device numbers, base addresses, hardware addresses, IP addresses, status of hardware, DHCP addresses, and gateway addresses. By matching the physical device information to the corresponding logical device, instrumentation service 23 is able to access relevant information for a hardware device such as NIC 14.

In the present embodiment, configuration test module 20 includes driver discovery module 30, TCP/IP stack test module 32 and connector test module 34. The driver discovery module 30 is operable to detect whether there is a driver (such as NIC driver 42) associated with NIC 14. In the present embodiment, driver discovery module 30 uses instrumentation service 23 to identify the driver associated with NIC 42. Driver discovery module 30 may further check if NIC driver 42 is loaded properly. If NIC driver 42 is missing or not loaded properly, NIC configuration module 20 communicates with test response generator 16. Test response generator 16 sends a message such as DRIVER_NOT_FOUND to the user. This signifies to the user that NIC driver 42 is missing or corrupt. If driver discovery module 30 detects that NIC driver 42 is present and loaded properly, then the NIC configuration test module 20 preferably proceeds to TCP/IP stack test module 32.

TCP/IP stack test module 32 tests whether TCP/IP stack test 44 is loaded properly. In the present embodiment TCP/IP stack test module 32 does not test any hardware and does not physically test NIC 14. TCP/IP stack test module 32 tests the TCP/IP by utilizing the loop-back address of server 12, which may also be referred to as the loop-back interface. In the present embodiment TCP/IP stack test module 32 operates by opening a communication socket of NIC 14 and binding the loop-back address to the open socket. TCP/IP stack test module 32 then sends packets to the loop-back address and monitors whether the packets are received.

In one particular embodiment, TCP/IP stack test module 32 works by opening a socket and binding local address 45 of server 12, which, in the present embodiment, is 127.0.0.1. TCP/IP stack test module 32 then sends a pre-determined number of packets to local address 45. TCP/IP stack test module 32 then detects whether each of the packets was received at local address 45. TCP/IP preferably sends and receives packets using send module 38 and receive module 40, as described below. In an alternate embodiment, NIC configuration test module 20 may include a separate send module and receive module for sending packets and receiving packets at the local address.

If TCP/IP stack test module 32 determines a failure related to the TCP/IP stack, NIC configuration test module 20 communicates with test response generator 16. Test response generator 16 then generates and sends an appropriate response. For instance, if the socket open operation is not successful, test response generator sends a SOCKET_OPEN_ERROR. If the communication socket could not be bound to local address 45, test response generator sends a SOCKET_BIND_ERROR. If the operation of sending the packet to the loopback address fails, test response generator 16 creates and sends a DATA_SEND_ERROR message to the user. If the operation of receiving a packet fails, test response generator 16 generates and sends a DATA_RECV_ERROR message to the user. If TCP/IP stack test module 32 determines that no error conditions exist in TCP/IP stack 44, NIC configuration test module 20 proceeds to connector test module 34. In the present embodiment, if TCP/IP stack test module 32 determines that an error condition exists, the testing of NIC 14 does not proceed.

Connector test module 34 tests whether NIC 14 is properly connected to server 12 and whether the connector associated with NIC 14 connects and functions properly.

Connector test module 34 is preferably operable to detect the attachment of NIC 14 and ensure that the associated cabling is properly attached. Connector test module 34 also checks the integrity of the cable connection to ensure it functions properly. Errors detected by connector test module 34 are communicated to test response generator 16 which generates and sends the user an error message such as CABLE_DISCONNECTED.

If driver discovery module 30, TCP/IP stack module 32 and connector test module 34 do not detect any error conditions, NIC configuration test module 20 initiates NIC communication test module 18.

In the present embodiment, NIC communication test module 18 includes local address discovery module 36, send module 38 and receive module 40. Local address discovery module 36 operates to identify a valid host (with an associated address) to communicate with NIC 14. In one embodiment local address discovery module 36 identifies a valid associated address by using ARP entries 22. ARP entries 22 may be a list of associated addresses that server 12 has communicated with during a selected period. ARP entries 22 may be part of an ARP table.

Send module 38 operates to send a pre-selected number of packets to the one or more associated addresses identified by local address discovery module 36. In one embodiment, send module sends a series of ten packets to the associated address. In alternate embodiments more or fewer packets may be sent by send module 38. Further, in the present embodiment, send module 38 preferably sends ping packets. However, in alternate embodiments send module 38 may send any suitable communication operable to generate a response from the node at the associated address.

Receive module 40 is preferably operable to receive response packets from an associated server. Receive module 40 may confirm that NIC 14 is operable to communicate with an associated server by receiving one or more responses from an associated server.

Figure 3:
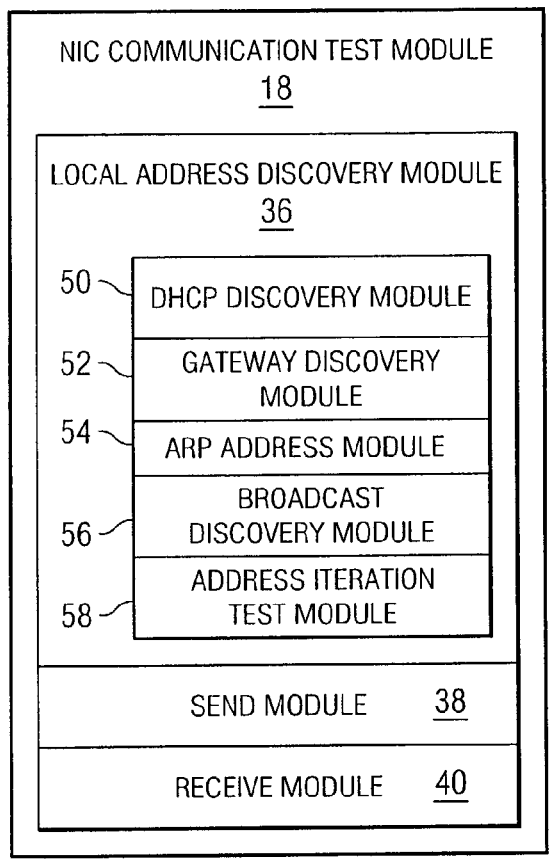
FIG. 3 illustrates a block diagram of a particular embodiment of a NIC communication test module.

FIG. 3 illustrates a block diagram of a particular embodiment of NIC communication test module 18. Local address discovery module 36 includes DHCP discovery module 50, gateway discovery module 52, ARP address module 54, broadcast discovery module 56 and address iteration module 58. Local address discovery module 36 identifies a valid associated address for NIC communication test module 18. In order to identify a valid address of a local server, local address discovery module 36 may utilize address ID discovery modules 50, 52, 54, 56 or 58.

Dynamic host configuration protocol (DHCP) discovery module 50 operates to identify a valid address of an associated DHCP server such as DHCP server 26. Discovery module 50 preferable identifies DHCP server 26 through communication with instrumentation service 23. In operation, if no associated address is identified by DHCP discovery module 50, local address discovery module 36 then proceeds to use gateway address discovery module 52 to find a valid address. If a valid associated address is identified by DHCP discovery module 50, local address discovery module 36 discontinues identifying addresses and communicates the identified address to send module 38. Send module 38 then sends packets to the identified address as described above. If no problems with the send and receive functions of NIC 14 have been identified and no response is received from the associated address, local address discovery module 50 may then continue attempting to identify another valid associated address using modules 50, 52, 54, 56 or 58.

In one embodiment local address discovery module 36 may attempt to identify another associated address while receive module 40 awaits a response from the identified associated server. If additional associated addresses are identified, send module 38 may preferably send packets to the newly identified associated addresses. In this embodiment, local address discovery module 36, send module 38 and received module 40 may all function at the same time. As local address discovery module 36 identifies different valid associated addresses, send module 38 may send a series of packets to associated addresses already identified and receive module 40 simultaneously waits for a response from servers that have been sent packets from send module 38. Once receive module 40 receives a packet from an associated server, the NIC communication test module 18 discontinues attempting to identify valid associated addresses and the test response generator 16 preferably generates and sends a PASSED message to the user.

Gateway discovery module 52 operates to identify a valid address of a gateway server such as gateway server 28. In the present embodiment, gateway discovery module 52 preferably identifies gateway server 28 through interaction with instrumentation service 23. If gateway discovery module 52 does not identify any valid gateway server addresses, or if the identified gateway servers do not respond, local address discovery module proceeds to ARP address module 54.

Address resolution protocol (ARP) address module 54 identifies valid associated addresses from ARP entries 22. ARP entries 22 contain a list of associated addresses that server 12 has communicated with during a selected period. ARP address module 54 identifies one or more associated addresses from ARP entries 22. If ARP address module 54 does not identify a valid address or receive module 40 does not receive a response from an identified associated address, local address discovery module 36 proceeds to the broadcast discovery module 56.

Broadcast discovery module 56 identifies a valid broadcast address as the associated address. This module also enables the broadcast function in send module 38 so that the broadcast message is sent to a local sub-network of associated servers. In one embodiment the associated address may be 255.255.255.255. This embodiment has the limitation that only Linux-based systems may respond to such a broadcast message. If receive module 40 does not receive any communications from associated servers within a selected period of time, local address discovery module 36 then proceeds to address iteration test module 58.

Address iteration test module 58 identifies a potential valid associated address by selectively modifying the digits of the address of server 12. In one embodiment, address iteration module 58 generates a series of potential valid associated addresses by modifying the last octet of digits in the address of server 12. The last octet of digits may preferably be modified between values 1 through 254 to develop a series of potential valid associated addresses. The address iteration module excludes the value of the server address from the series of potential valid associated addresses. Once a potential valid address has been modified, send module 38 sends one or more packets to the series of potential addresses. If receive module 40 receives a response from one or more potential valid associated addresses, then test response generator 16 sends a PASSED message and NIC communication test module 18 ends. If a response is not received from any of the series of potential addresses, NIC communication test module 18 may discontinue searching for associated addresses and test response generator 16 preferably generates an error message such as DESTINA- TION_HOST_UNREACHABLE. In the present embodiment, the DESTINATION_HOST_UNREACHABLE error message is not sent by NIC communication test module until each of the discovery modules 50, 52, 54, 56, and 58 have been utilized and have not successfully identified a reachable valid associated address.

In the present embodiment, local address discovery module 36 sequentially prompts address ID discovery modules 50, 52, 54, 56 and 58 until a valid associated address has been identified. The present disclosure contemplates that local address discovery module 36 may utilize the modules 50, 52, 54, 56 and 58 in any order or may repeat use of some modules without first utilizing other modules.

In another embodiment, the length of time of that NIC communication test module 18 operates may be modified by adjusting the number of valid associated addresses identified by local address discovery module 36. Additionally, for each address identified, a time period may be pre-selected to determine whether the valid associated address responds. In one embodiment NIC communication test module 18 may limit testing to five associated addresses. In other embodiments NIC communication test module 18 may test hundreds of associated addresses. For example, ARP address module 54 may identify a single associated address or a plurality of associated addresses in ARP entries 22. By varying the number of associated addresses tested for each module, NIC communication test module 18 can vary its operating time to fit the needs of a user or system.

Figure 4:
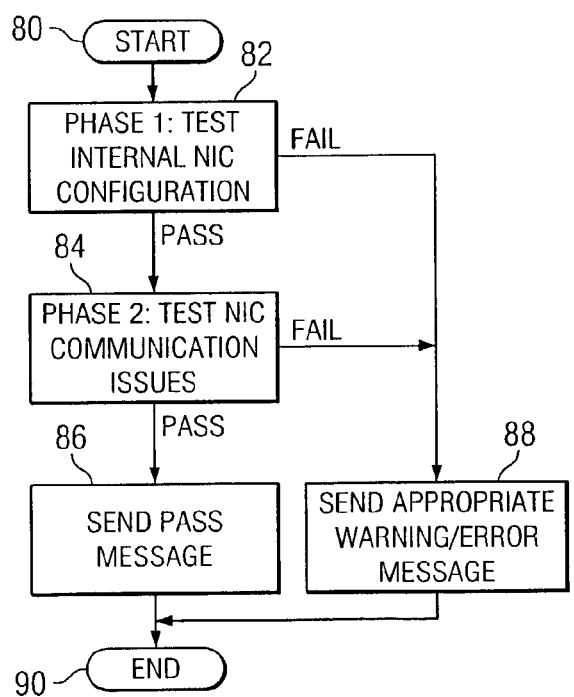
FIG. 4 illustrates a flow chart of a method for testing a network interface card (NIC) in an information handling system according to the present disclosure.

FIG. 4 illustrates a flow chart of a method for testing network interface card (NIC) 14 in information handling system 10 according to the present disclosure. The method begins at step 80.

Step 82 is the first phase of two phases of diagnosing NIC 14 for errors. This first phase primarily diagnoses problems with the configuration of NIC 14, TCP/IP stack 44 and NIC driver 42. At step 82, the NIC configuration test module 20 tests NIC 14 to detect configuration errors associated with NIC 14, TCP/IP stack 44 and NIC driver 42.

If NIC 14 fails the configuration testing of step 82, the method proceeds to step 88. At step 88 test response generator 16 generates the appropriate test response describing the detected error and sends the appropriate warning or error message to the user. After the error message has been sent, the method ends at step 90.

If NIC 14 should pass all aspects of the configuration test, the method proceeds to the second phase of testing at step 84. At step 84 NIC communication test module 18 tests NIC 14 to determine if NIC 14 can successfully communicate with another server. This step includes having the NIC communication test module 18 identify an associated server having a valid network address and test NIC 14 to whether NIC 14 communicates with the identified associated server such as DHCP server 26.

If NIC 14 should fail the communication test, the method proceeds to step 88. At step 88 test response generator 16 creates an appropriate communication error response and sends the appropriate warning/error message to a user. Then the method ends at step 90.

If NIC 14 passes the communication test, the method continues to step 86. At step 86 test response generator 16 creates a passing message and sends the passing message to a user. Then the method ends at step 90.

Figure 5:
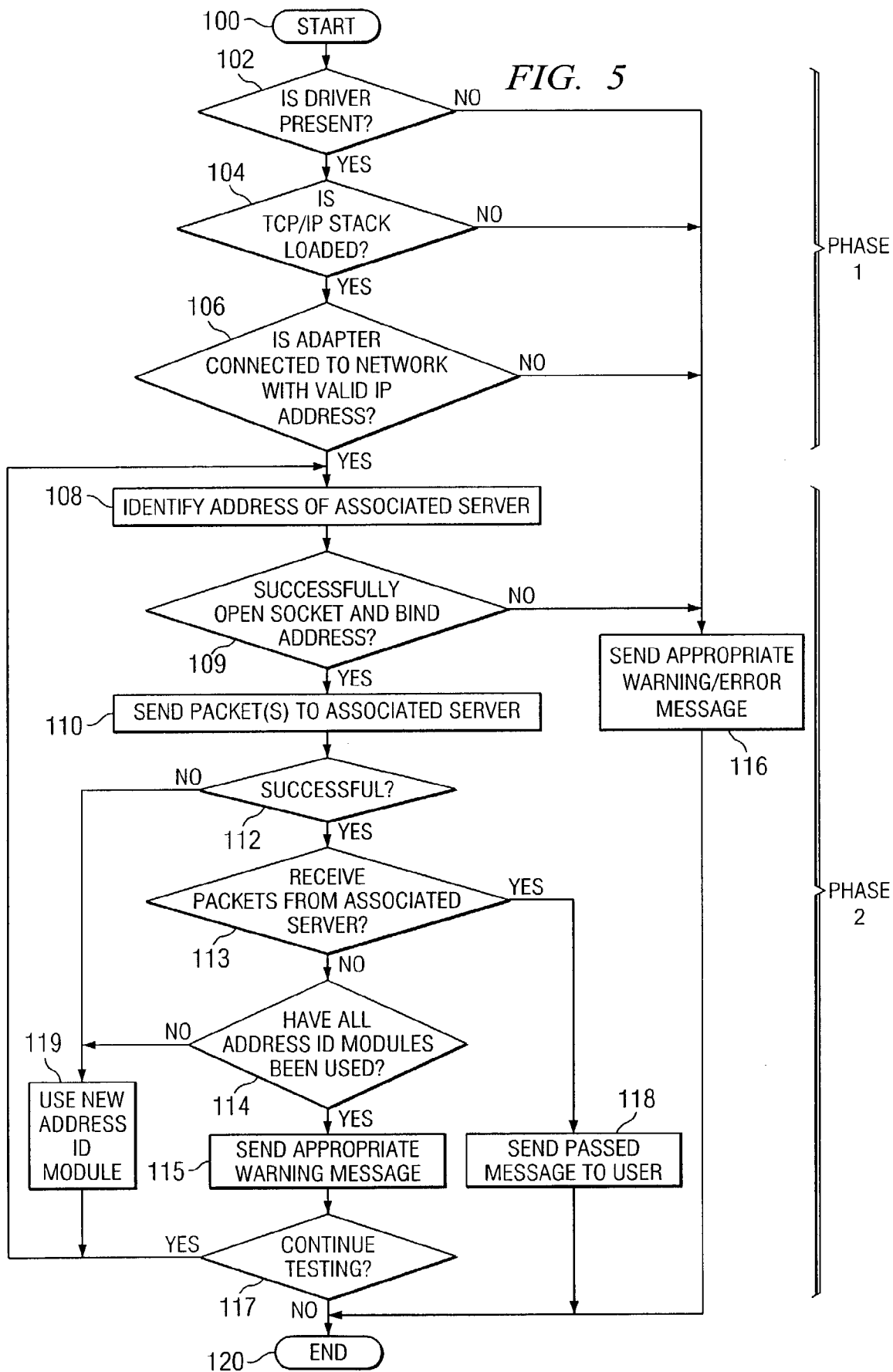
FIG. 5 illustrates a flow chart of a particular embodiment of a method for testing a NIC in an information handling system.

FIG. 5 illustrates a flow chart of a particular embodiment of a method for testing a NIC in an information handling system. The method begins at step 100 when the NIC diagnosing begins and proceeds to the first phase of NIC testing. The first phase tests NIC 14 for configuration errors and includes steps 102, 104, and 106.

The configuration test starts at step 102. At 102 driver discovery module 30 determines whether the NIC driver 42 is properly installed on NIC 14. This includes determining whether there is a NIC driver 42 present and if NIC driver 42 functions correctly.

If step 102 detects an error, the method proceeds to step 116. At step 116, test response generator 16 generates an appropriate warning response such as DRIVER_NOT_PRESENT and sends it to the user. The method then proceeds to step 120 where the method ends. If driver discovery module 30 determines no errors at step 102, the method continues to step 104.

At step 104, the TCP/IP stack test module 32 determines whether TCP/IP stack 44 is loaded properly. TCP/IP stack test module 32 does this by opening a communication socket to NIC 14 and binding the socket to a loopback address.

If TCP/IP stack test module 32 determines an error condition exists at step 104, the method proceeds to step 116. At step 116, test response generator 16 generates an appropriate warning response. If the socket open operation fails, test response generator 16 may generate and send a SOCKET_OPEN_ERROR message to the user. If the socket bind operation fails, test response generator 16 may create and send a SOCKET_BIND_ERROR message. After sending an error message, the method ends at step 120. If no error is determined at step 104, the method continues to step 106.

At step 106, connector test module 34 determines if NIC 14 connects to a functioning cable and if NIC 14 has a valid network address. Connector test module 34 may test to see if the cable is working by using instrumentation service 23 associated with information handling system 10. Connector test module 34 may preferably test the network address of NIC 14 for validity by sending a packet to the loopback address.

If at step 106 connector test module 34 determines an error condition exists, the method proceeds to step 116. At step 116, test response generator 16 generates an appropriate warning response. If the cable is not connected or not functioning properly, test response generator 16 creates and sends a CABLE_DISCONNECTED message. If the operation of sending the packet to the loopback address fails, test response generator 16 creates and sends a DATA_SEND_ERROR message to the user. If the receiving a packet operation fails, test response generator 16 generates and sends a DATA_RECV_ERROR message to the user. If the address associated with NIC 14 is null, test response generator 16 generates and sends a DEVICE_NOT_CONFIGURED message to the user. Then the method proceeds to step 120 where the method ends. If no error is determined at step 106, the method continues to the second phase of operations.

The second phase consists of steps 108, 109, 110, 112, 113, 114, 115, 117 and 119. In these steps NIC communication test module 18 identifies an associated server having a valid network address. By valid, the address should not be null and also not the same address of server 12. NIC communication test module 18 further tests NIC 14 to whether NIC 14 communicates with the identified associated server.

At step 108, the local address discovery module 36 identifies an associated server having a valid network address. Local address discovery module 36 may identify an address by searching for a known address or creating a potential address. In one embodiment (as shown in FIG. 3), local address discovery module 36 identifies an associated address from DHCP discovery module 50, gateway discovery module 52, ARP module 54, broadcast discovery module 56 and/or address iteration test module 58 as described above.

Once an associated address has been identified, the method proceeds to step 109. At step 109, send module 38 opens a socket and binds the network address of NIC 42 to the socket. If either of these operations fail, send module 38 determines an error the method proceeds to step 116. At step 116, test response generator 16 generates an appropriate warning response. If the socket open operation fails, test response generator 16 sends a SOCKET_OPEN_ERROR message to the user. If the socket bind operation fails, test response generator 16 sends a SOCKET_BIND_ERROR message to the user. Then the method proceeds to step 120 where the method ends. If no error is determined at step 109, the method continues to step 110.

At step 110, send module 38 sends a ping packet to the network address of the associated server. In one embodiment send module 38 sends a series of ten packets to the associated server. Other embodiments may include send more or fewer packets to each associated server.

At step 112, send module 38 determines whether the send operation of step 110 was successful. If the send operation was not successful, the method proceeds to step 119. At step 119, local address discovery module 36 determines a module 50, 52, 54, 56 and 58 that has not yet been used. Using this new module, the method proceeds to step 108 where local address discovery module 36 identifies an address of an associated server. If no error is determined at step 112, the method continues to step 113.

At step 113, receive module 40 waits to receive a response packet from the associated server. If at step 113 receive module 40 receives a response packet from an associated server the method proceeds to step 118. At step 118 test response generator 16 creates a PASSED message and sends it to a user. The method then proceeds to step 120 where the method ends.

If at step 113 receive module 40 does not receive a response packet from the associated server after a set period of time, the receive module proceeds to step 114.

At step 114, local address discovery module 36 determines whether all address identification modules 50, 52, 54, 56 and 58 have been used. If local address discovery module 36 has not used all of modules 50, 52, 54, 56 and 58, the method proceeds to step 119. At step 119 local address discovery module 36 determines a module 50, 52, 54, 56 and 58 that has not yet been used. Using this new module, the method proceeds to step 108 where local address discovery module 36 identifies an address of an associated server.

At step 114, if local address discovery module 36 has determined that all of the address ID modules 50, 52, 54, 56 and 58 have been used, the method then proceeds to step 115. At step 115, test response generator 16 generates an appropriate warning response. If no response has been received by receive module 40, test response generator 16 sends a DESTINATION_HOST_UNREACHABLE message to the user. Then the method proceeds to step 117.

At step 117 NIC communication test module 18 decides whether to continue testing if NIC 42 can communicate with an outside server. If NIC communication test module 18 decides to test another address, the method continues to step 108. At step 108 local address discovery module 36 again identifies another associated address. This loop continues until receive module 40 receives at least one response packet from the associated server or until NIC communication test module 18 determines to stop testing.

If NIC communication test module 18 determines to end the communication testing, the method proceeds to step 120 where the method ends. NIC communication test module 18 may decide to end the testing for a variety of reasons. In one embodiment NIC communication test module 18 may end testing after attempting to identify a local address using the series of five local address discovery modules as described in FIG. 6. In another embodiment, the NIC communication test module may have a pre-set time to test, and if no positive results are received in this time NIC communication test module 18 may end without receiving a response from receive module 40. In another embodiment, NIC communication test module 18 may end the test after attempting to send packets to a preselected number of identified associated addresses.

Figure 6:
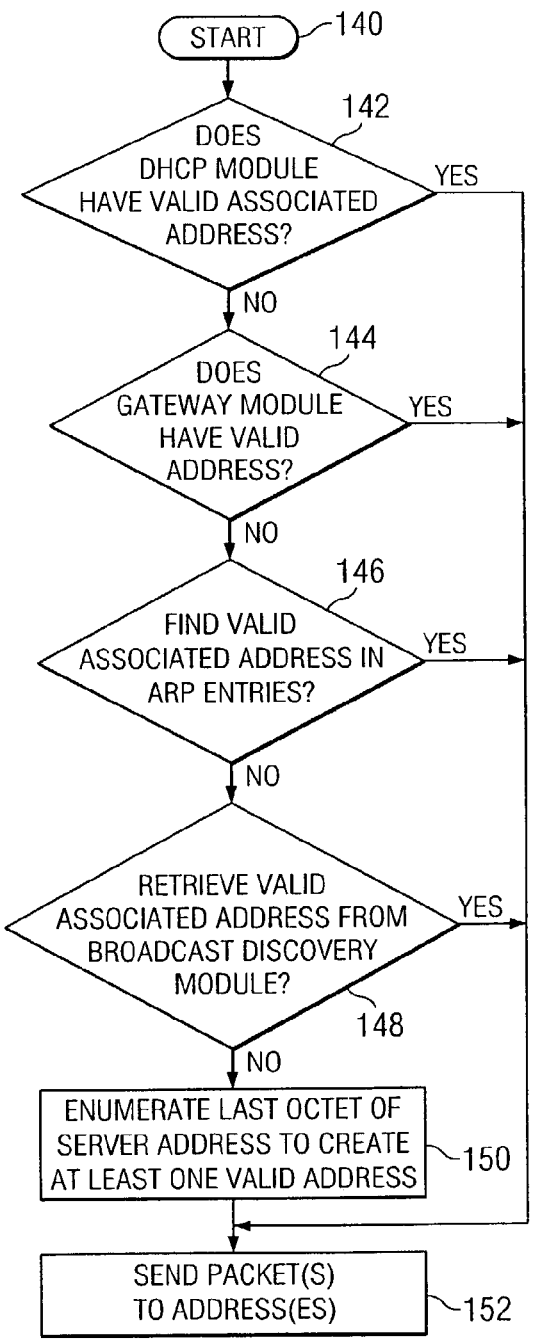
FIG. 6 illustrates a flow chart of a method of identifying an associated address according to the specifications of the present disclosure.

FIG. 6 illustrates a flow chart of a method of identifying an associated address according to the present disclosure. The method begins at step 140. Local address discovery module 36 identifies an associated address by proceeding through steps 142, 144, 146, 148, 150 and 152. In the present embodiment local address discovery module 36 performs these steps sequentially. In alternate embodiments local address discovery module may proceed through these steps non-sequentially.

At step 142, local address discovery module 36 attempts to identify a valid associated address from dynamic host configuration protocol (DHCP) discovery module 50. In one embodiment, DHCP discovery module 50 may identify an address of a known DHCP server.

If local address discovery module 36 successfully identifies a valid address from DHCP discovery module 50, the method proceeds to step 152. At step 152, send module 38 opens a socket, binds the address of NIC 42 to the socket and sends a packet to the associated address. If the local address discovery module 36 does not identify an address from DHCP discovery module 50, then the method continues to step 144.

At step 144, local address discovery module 36 attempts to identify an associated address from a gateway discovery module 52. In one embodiment, gateway discovery module 52 may identify one associated address of a known gateway server. In another embodiment, gateway discovery module 52 may identify two or more addresses of known gateway servers.

If local address discovery module 36 successfully identifies a valid address from gateway discovery module 52, the method proceeds to step 152. At step 152 send module 38 opens a socket, binds the address of NIC 42 to the socket and sends a packet to the associated address. If local address discovery module 36 does not identify an address from gateway discovery module 52, the method then continues to step 146.

At step 146, local address discovery module 36 attempts to identify a valid associated address from address resolution protocol (ARP) module 54. In one embodiment, ARP module 54 iterates through ARP entries 22 and identifies one associated address from ARP entries 22. In another embodiment, ARP module 54 identifies a plurality of valid associated addresses from ARP entries 22.

If local address discovery module 36 successfully identifies a potential valid address from ARP module 54, the method proceeds to step 152. At step 152 send module 38 opens a socket, binds the address of NIC 42 to the socket and sends a packet to the associated address. If the local address discovery module 36 does not identify a valid address from ARP module 54, then the method continues to step 148.

At step 148, local address discovery module 36 attempts to identify a valid associated address from broadcast discovery module 56. In one embodiment, broadcast discovery module 56 identifies "255.255.255.255" as the associated broadcast address.

If local address discovery module 36 successfully identifies a valid broadcast address from broadcast discovery module 56, the method proceeds to step 152. At step 152 send module 38 opens a socket, binds it to the address of NIC 42, enables the broadcast flag in send module 38 and sends a packet to the associated address. If the local address discovery module 36 does not identify a valid address from broadcast discovery module 56, then the method continues to step 150.

At step 150, local address discovery module 36 attempts to identify a valid associated address from address iteration test module 58. In one embodiment, address iteration test module 58 takes the network address of server 12, then changes the last octet of digits on the address of server 12 in order to create a potential valid associated address. Address iteration test module 58 may iterate the last octet of digits between 1 and 254. Address iteration test module 58 preferably excludes the address of server 12. In a further embodiment, address iteration test module 58 may identify at least one potential valid associated address and preferably generates a series of potential associated addresses.

Once local address discovery module 36 identifies a potential valid associated address from address iteration test module 58, the method proceeds to step 152. At step 152 send module 38 opens a socket, binds the address of NIC 42 to the socket and sends a packet to the potential associated address. Local address discovery module 36 then ends once step 152 occurs. However, local address discovery module 36 may use this address identification method numerous times during the operation of NIC communication test module 18.

Although the disclosed embodiments have been described in detail, it should be understood that various changes, substitutions and alterations can be made to the embodiments without departing from their spirit and scope.

What is claimed is:

1. An information handling system comprising:
    a server having a network interface card (NIC), a NIC configuration test module, a NIC communication test module, and a test response generator;
    the NIC operable to communicate with a network;
    the NIC configuration test module operable to detect NIC configuration errors;
    the NIC communication test module operable to identify at least one network address, send at least one packet to the at least one network address, and receive at least one response from the at least one network address;
    the test response generator operable to receive a configuration error condition report from the configuration test module.

2. The information handling system of claim 1, wherein the NIC configuration module comprises a driver discovery module, a TCP/IP stack test module and a connector test module:
    the driver discovery module operable to detect a driver associated with the NIC;
    the TCP/IP stack test module operable to determine whether the TCP/IP stack is properly loaded;
    the connector test module operable to detect if a connector associated with the NIC connects and functions properly; and
    the connector test module further operable to determine if the server has a valid address.

3. The information handling system of claim 1, wherein the NIC communication test module comprises a local address discovery module, a send module, and a receive module:
    the local address discovery module operable to determine the at least one associated address;
    the send module operable to send at least one packet to the at least one associated address; and
    the receive module operable to receive at least one packet from an associated server at the associated address.

4. The information handling system of claim 3, further comprising the send module operable to send a series of a selected number of ping packets to an associated address.

5. The information handling system of claim 3, wherein the local address discovery module further comprises:
    a dynamic host configuration protocol (DHCP) discovery module operable to locate at least one address of an associated DHCP server;
    a gateway discovery module operable to locate at least one address of an associated gateway server;
    an ARP address module operable to search a plurality of address resolution protocol (ARP) entries and select at least one associated address from a list of ARP entries;
    a broadcast discovery module operable to broadcast a packet to associated addresses; and
    an address iteration module operable to search for associated address by selectively modifying the digits of the server address.

6. The information handling system of claim 5 further comprising:
    the server having a server address;
    the address iteration module operable to generate a series of potential associated addresses by modifying the last octet of digits in the server address; and
    the address iteration module further operable to exclude the server address from the series of potential associated addresses.

7. The information handling system of claim 5 further comprising the local address discovery module operable to sequentially prompt a series of discovery modules until a valid associated address has been identified, the series of discovery modules selected from the group consisting of: the DHCP discovery module, the gateway discovery module, the ARP address module, the broadcast discovery module and the address iteration module.

8. The information handling system of claim 5 wherein the ARP entries further comprise a selected portion of an ARP table.

9. The information handling system of claim 1 wherein the NIC configuration module and the NIC communication test module are both operable to function in at least two operating system environments.

10. A network interface card (NIC) testing system comprising:
    a NIC configuration test module operable to detect a configuration error condition in an associated NIC;
    a NIC communication test module operable to determine at least one valid local network address and operable to send test packets to the at least one valid local network address to identify communication errors associated with the NIC; and
    a NIC response generator operable to send an error message indicating an identified error condition.

11. The testing system of claim 10 wherein the NIC configuration test module further comprises:

a driver discovery module operable to detect a driver associated with the NIC;

a TCP/IP stack test module operable to determine whether the TCP/IP stack is properly loaded;

the connector test module operable to detect if a connector associated with the NIC connects and functions properly; and the connector test module further operable to determine if the server has a valid address.

12. The NIC testing system of claim 10 wherein the NIC communication test module further comprises:

a local address discovery module operable to identify at least one associated address;

a send module operable to send at least one packet to the at least one associated address; and a receive module operable to receive at least one response from the at least one associated address.

13. The NIC testing system of claim 12 wherein the local address discovery module further comprises individual address modules including:

a dynamic host configuration protocol (DHCP) discovery module operable to locate at least one address of an associated DHCP server;

a gateway discovery module operable to locate at least one address of an associated gateway server;

an ARP address module operable to search a plurality of address resolution protocol (ARP) entries and select at least one associated address from a list of ARP entries;

a broadcast discovery module operable to broadcast a packet to associated addresses; and an address iteration module operable to search for associated address by selectively modifying the digits of the server address.

14. The information handling system of claim 13 further comprising the local address discovery module operable to sequentially prompt a series of discovery modules until a valid associated address has been identified, the series of discovery modules selected from the group consisting of: the DHCP discovery module, the gateway discovery module, the ARP address module, the broadcast discovery module and the address iteration module.

15. The NIC testing system of claim 10 wherein the NIC configuration test module and NIC communication test module test the NIC during NIC operation.

16. The NIC testing system of claim 10 further comprising the NIC communication test module operable to test in at least two operating system environments.

17. A method to test a network interface card (NIC) within a server in an information handling system, the method comprising:

testing the NIC to detect configuration errors associated with the NIC;

identifying an associated server having a valid network address;

testing the NIC to determine whether the NIC operably communicates with the identified associated server; and generating a test result response describing a detected error.

18. The method of claim 17 wherein testing for configuration errors further comprises:

determining whether a selected driver is operably installed on the NIC;

determining whether the TCP/IP stack is operably loaded by opening a communication socket to the NIC and binding the socket to a loopback address; and determining that the NIC is connected to a functioning cable.

19. The method of claim 17 wherein communicating with the identified associated server further comprises:

sending a ping packet to the network address of the associated server; and receiving a response packet from the associated server.

20. The method of claim 17 wherein identifying an associated address further comprises:

identifying an associated address from a dynamic host configuration protocol (DHCP) module;

identifying an associated address from a gateway discovery module;

identifying an associated address from an address resolution protocol (ARP) module;

identifying an associated address from a broadcast discovery module; and identifying an associated address from an address iteration module.

* * * * *